(12) United States Patent
Wang et al.

(10) Patent No.: US 10,310,163 B2
(45) Date of Patent: Jun. 4, 2019

(54) DISPLAY PANEL AND DISPLAY DEVICE

(71) Applicants: BOE TECHNOLOGY GROUP CO., LTD., Beijing (CN); BOE OPTICAL SCIENCE AND TECHNOLOGY CO., LTD., Suzhou Jiangsu (CN)

(72) Inventors: Tao Wang, Beijing (CN); Chunming Wu, Beijing (CN)

(73) Assignees: BOE TECHNOLOGY GROUP CO., LTD., Beijing (CN); BOE OPTICAL SCIENCE AND TECHONOLOGY CO., LTD., Suzhou, Jiangsu (CN)

( * ) Notice: Subject to any disclaimer, the term of this patent is extended or adjusted under 35 U.S.C. 154(b) by 192 days.

(21) Appl. No.: 15/501,275

(22) PCT Filed: May 31, 2016

(86) PCT No.: PCT/CN2016/084047
§ 371 (c)(1),
(2) Date: Feb. 2, 2017

(87) PCT Pub. No.: WO2017/152514
PCT Pub. Date: Sep. 14, 2017

(65) Prior Publication Data
US 2018/0217315 A1    Aug. 2, 2018

(30) Foreign Application Priority Data
Mar. 7, 2016 (CN) .......................... 2016 1 0127528

(51) Int. Cl.
*F21V 8/00* (2006.01)
*G02B 6/00* (2006.01)
(Continued)

(52) U.S. Cl.
CPC ............. *G02B 6/0055* (2013.01); *G02B 6/00* (2013.01); *G02B 6/0036* (2013.01);
(Continued)

(58) Field of Classification Search
None
See application file for complete search history.

(56) References Cited

U.S. PATENT DOCUMENTS 6,412,969 B1 * 7/2002 Torihara ............... G02B 6/0021
349/62
6,648,485 B1 * 11/2003 Colgan ................ G02B 6/0016
362/331
(Continued)

FOREIGN PATENT DOCUMENTS

CN     1414418 A     4/2003
CN     1585911 A     2/2005
(Continued)

OTHER PUBLICATIONS

Office Action in Chinese Application No. 201610127528.4 dated Jan. 11, 2017, with English translation. 9 pages.
(Continued)

*Primary Examiner* — Elmito Breval
(74) *Attorney, Agent, or Firm* — Womble Bond Dickinson (US) LLP

(57) ABSTRACT

A display panel and a display device are disclosed. The display panel comprises: a display substrate, an optical substrate, a light guide plate and a first frame; wherein: the optical substrate is arranged between the display substrate and the light guide plate, and the first frame is arranged on the same side edge of the display substrate, the optical substrate and the light guide plate; the light guide plate comprises a first portion and a second portion, wherein the second portion is formed by the first portion extending to the first frame from a side close the first frame, and the distance between the second portion and the first frame is smaller than the thickness of the light guide plate. Accordingly, the length of the light guide plate is increased, and the increased portion of the light guide plate extends into the first frame,
(Continued)

enabling the light rays emitted from the backlight source to completely illuminate the display region after being reflected by the light guide plate, which improves the display effect.

16 Claims, 3 Drawing Sheets

(51) Int. Cl.
*G09F 9/30* (2006.01)
*G02B 5/30* (2006.01)
*G02B 5/02* (2006.01)

(52) U.S. Cl.
CPC ......... *G02B 6/0058* (2013.01); *G02B 6/0088* (2013.01); *G09F 9/30* (2013.01); *G02B 5/0231* (2013.01); *G02B 5/30* (2013.01)

(56) References Cited

U.S. PATENT DOCUMENTS

| | | | | |
|---|---|---|---|---|
| 2008/0049168 A1* | 2/2008 | Kubota | ................ | G02B 6/0021 349/65 |
| 2010/0290247 A1* | 11/2010 | Im | ..................... | G02B 6/0091 362/606 |
| 2013/0051069 A1* | 2/2013 | Moon | ............... | G02F 1/133615 362/608 |
| 2014/0226073 A1* | 8/2014 | Kamada | ............ | G02F 1/133512 348/725 |
| 2015/0160405 A1* | 6/2015 | Park | .................. | G02F 1/133308 362/606 |
| 2016/0282536 A1* | 9/2016 | Zhang | .................. | G02B 6/0021 |

FOREIGN PATENT DOCUMENTS

| | | |
|---|---|---|
| CN | 101994956 A | 3/2011 |
| CN | 102086995 A | 6/2011 |
| CN | 102297347 A | 12/2011 |
| CN | 203615170 U | 5/2014 |
| CN | 203658708 U | 6/2014 |
| CN | 203706159 U | 7/2014 |
| CN | 104791715 A | 7/2015 |
| CN | 104834048 A | 8/2015 |
| CN | 105093398 A | 11/2015 |
| CN | 205028005 U | 2/2016 |
| CN | 105551389 A | 5/2016 |
| JP | H 11160700 A | 6/1999 |

OTHER PUBLICATIONS

International Search Report and Written Opinion in PCT/CN2016/084047 dated Sep. 1, 2016, with English translation, 15 pages.

Office Action received for Chinese Patent Application No. 201610127528.4, dated Jan. 16, 2018, 12 pages (8 pages of English Translation and 4 pages of Office Action).

Office Action in Chinese Application No. 201610127528.4 dated Aug. 9, 2017, with English translation.

* cited by examiner

DISPLAY PANEL AND DISPLAY DEVICE

RELATED APPLICATIONS

The present application is the U.S. national phase entry of PCT/CN2016/084047, with an international filing date of May 31, 2016, which claims the benefit of Chinese Patent Application No. 201610127528.4, filed on Mar. 7, 2016, the entire disclosures of which are incorporated herein by reference.

FIELD

This disclosure relates to the field of display technologies, and in particular to a display panel and a display device.

BACKGROUND ART

With the rapid development of display technologies and the increasingly high requirements of users for display devices such as a smart phone, a tablet computer and a personal computer, it is desired that the display screen should be maximized in a limited space. In order to satisfy the users' requirements, this is now usually achieved by reducing a distance between the display screen and the frame.

FIG. 1 is a schematic section view of the structure of an existing display panel. The section is taken by cross-cutting the display panel by using a plane parallel with any side of the display panel and perpendicular to a display plane of the display panel. Referring to FIG. 1, the display panel comprises a display substrate 1, a first frame 2, an optical substrate 3, a second frame 4, a light guide plate 5 and a back plate 6. The display panel comprises a display region 11 and a black fringe region 12, and the length of the light guide plate 5 is smaller than that of the display region 11. When a backlight source emits light rays, the light rays are reflected to the display region 11 by the light guide plate 5 so as to illuminate the display region 11 such that a user can see contents displayed in the display region 11.

However, the display panel at least has a problem as follows: since the length of the light guide plate 5 is smaller than that of the display region 11, a dark area is formed at a border of the display region 11 close to the black fringe region 12. The light rays reflected by the light guide plate 5 cannot be reflected to the dark area, so the user cannot see contents displayed in the dark area, which results in a poor display effect.

SUMMARY

According to a first aspect of this disclosure, a display panel is provided, the display panel comprising: a display substrate, an optical substrate, a light guide plate and a first frame; wherein: the optical substrate is arranged between the display substrate and the light guide plate, and the first frame is arranged on the same side edge of the display substrate, the optical substrate and the light guide plate; the light guide plate comprises a first portion and a second portion, wherein the second portion is formed by the first portion extending to the first frame from a side close to the first frame, and the distance between the second portion and the first frame is smaller than the thickness of the light guide plate.

In a further embodiment of this disclosure, the shape of a cross-section of the second portion comprises a triangle, a rectangle, a trapezoid, or an arc.

In a further embodiment of this disclosure, the light guide plate further comprises a plurality of reflectors, the plurality of reflectors being at least arranged on a side surface of the second portion close to the first frame and on a horizontal surface of the first portion.

In a further embodiment of this disclosure, each of the plurality of reflectors comprises a conic reflector, a cylindrical reflector, a cubic reflector, a triangular reflector, a rectangular reflector, a trapezoidal reflector or a rhombic reflector.

In a further embodiment of this disclosure, the optical substrate extends to the first frame, and the distance between the optical substrate and the first frame is smaller than the thickness of the optical substrate.

In a further embodiment of this disclosure, the display panel further comprises a back plate, the back plate being arranged on a side of the light guide plate facing away from the optical substrate.

In a further embodiment of this disclosure, the display panel further comprises a second frame, the second frame being arranged between the light guide plate and the back plate.

In a further embodiment of this disclosure, the back plate further comprises a convex portion, the convex portion being arranged between the first frame and the light guide plate.

In a further embodiment of this disclosure, the second frame surrounds the light guide plate, and the shape of the second frame matches that of the light guide plate.

According to a second aspect of this disclosure, a display device is provided, the display device comprising the display panel according to the first aspect of this disclosure.

BRIEF DESCRIPTION OF DRAWINGS

In order to make the technical solutions and the advantages of this disclosure clearer, embodiments of this disclosure will be described in detail as follows with reference to the drawings.

DETAILED DESCRIPTION

Reference signs: 1—display substrate; 11—display region; 12—black fringe region; 2—first frame; 3—optical substrate; 4—second frame; 5—light guide plate; 51—first portion; 52—second portion; 53—reflector; 6—back plate; 61—convex portion.

Figure 2:
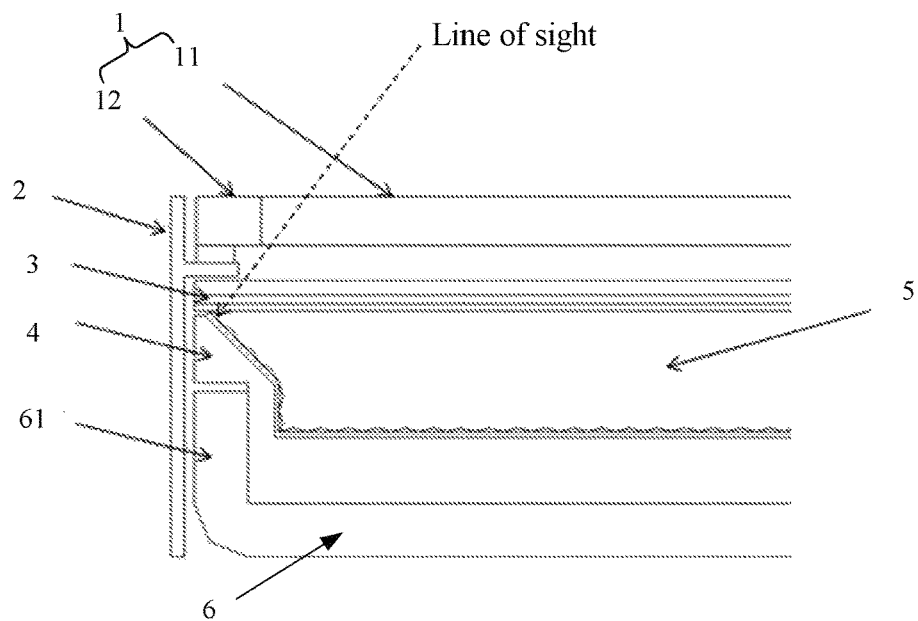
FIG. 2 is a schematic section view of the structure of a display panel according to an embodiment of this disclosure.

FIG. 2 is a schematic section view of the structure of a display panel according to an embodiment of this disclosure. Referring to FIG. 2, the display panel comprises a display substrate 1, an optical substrate 3, a light guide plate 5 and a first frame 2. The optical substrate 3 is arranged between the display substrate 1 and the light guide plate 5. The first frame 2 is arranged on the same side edge of the display substrate 1, the optical substrate 3 and the light guide plate 5.

The optical substrate 3 comprises a plurality of optical films having different functions, such as a polarizer or a phase difference film. The display substrate 1 comprises a display region 11 and a black fringe region 12. In a display panel with a super narrow border, the area of the display region 11 is generally greater than that of the black fringe region 12 so as to maximize the display screen. The second frame 2 can be made of metals or other composite materials for protecting the entire display panel. In order to achieve a super narrow border, the thickness of the first frame 2 is usually below 2 mm (millimeter).

Figure 1:
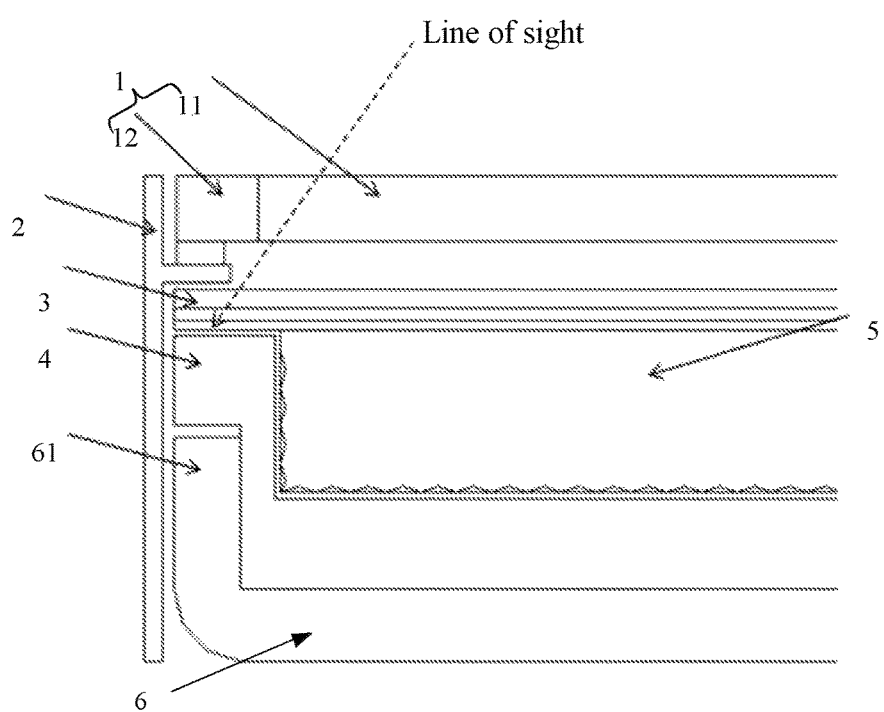
FIG. 1 is a schematic section view of the structure of an existing display panel.
Figure 3:
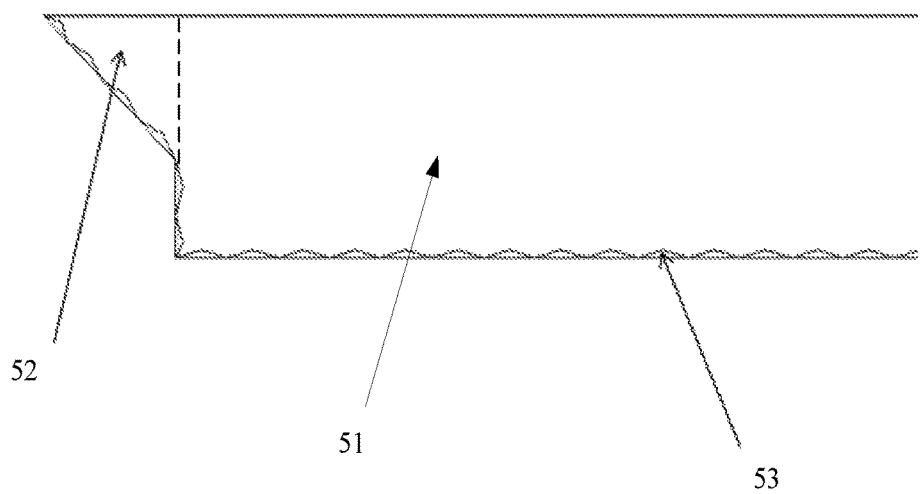
FIG. 3 is a schematic section view of the structure of a light guide plate according to a further embodiment of this disclosure.

The light guide plate 5 has a function of propagating light rays and it can reflect the light rays emitted from a backlight source to the display region 11. FIG. 3 is a schematic section view of the structure of a light guide plate according to a further embodiment of this disclosure. Referring to FIG. 3, the light guide plate 5 comprises a first portion 51 and a second portion 52. The length of the first portion 51 is equal to that of the light guide plate in the existing display panel as shown in FIG. 1, and the second portion 52 is formed by the first portion 51 extending to the first frame 2 from a side close to the first frame 2. It should be noted that when the first portion 51 extends to the first frame 2 from the side close to the first frame 2, it can extend to the first frame 2 with either the entire side as a starting point, or part of the side as a starting point. In order to save space and reduce the weight of the display panel, in this embodiment the second portion 52 is formed by the first portion 51 extending to the first frame with part of the side as a starting point. With the above extending process, the second portion 52 is closer to the first frame 2 as compared with the first portion 51. The distance between the second portion 52 and the first frame 2 is smaller than the thickness of the light guide plate 5. That is, the minimum distance between the second portion 52 and the first frame 2 is 0, and the maximum distance is the thickness of the light guide plate 5. For example, the thickness of the light guide plate is 5 mm, and the distance between the first portion 52 and the first frame 2 can be 0 mm, 2 mm, 3 mm and so on. Such a way of design is adopted mainly because: as the distance between the second portion 52 of the light guide plate and the first frame 2 increases, a reflection angle of the light guide plate 5 gradually decreases; when the distance between the second portion 52 and the first frame 2 is equal to the thickness of the light guide plate 5, the light rays emitted from the backlight source can right illuminate the display region 11 completely after being reflected by the light guide plate 5, and when the distance between the second portion 52 and the first frame 2 is greater than the thickness of the light guide plate 5, there will be a dark area around the display region 11, which results in a poor display effect.

In a further embodiment of this disclosure, the shape of a cross-section of the second portion 52 can be triangular, rectangular, trapezoidal, arc-shaped, and so on. The cross-section of the second portion as shown in FIG. 2 is in a triangular shape.

Referring to FIG. 3, the light guide plate 5 can further comprise a plurality of reflectors 53 to enhance the reflection effect. The reflectors 53 have various forms, for example, they can be conic reflectors, cylindrical reflectors, cubic reflectors, triangular reflectors, rectangular reflectors, trapezoidal reflectors, rhombic reflectors and so on. In a practical application, the reflectors 53 can be formed by subjecting the light guide plate 5 to surface treatments such as rubbing, polishing and sandblasting. In this embodiment, these reflectors are at least arranged on a side surface of the second portion 52 opposite to the first frame 2 and on a horizontal surface of the first portion 51. As shown in FIG. 2, the reflectors are arranged on a tilted side surface of the triangular second portion 52 and on a horizontal surface of the first portion remote from the optical substrate.

In order to achieve a narrow border, the optical substrate 3 can extend to the first frame 2, and the distance between the optical substrate 3 and the first frame is smaller than the thickness of the optical substrate 3. For example, the thickness of the optical substrate 3 is 3 mm, and the distance between the optical substrate 3 and the first frame 2 can be 0~3 mm. Such a way of design not only ensures stability of the structure of the display panel, but also makes the frame of the display panel narrower.

Referring to FIG. 2, the display panel can further comprise a back plate 6. The back plate 6 further comprises a convex portion 61, the convex portion being arranged between the first frame 2 and the light guide plate 5 such that the back plate 6 is arranged on a side of the light guide plate 5 facing away from the optical substrate 3 in a position evading manner. Such a way of design can avoid a concentration of a local stress generated in bearing the light guide plate 5, and thereby improve reliability of the display panel.

Referring to FIG. 2, the display panel can further comprise a second frame 4 to make the structure of the display panel more stable. The second frame 4 is generally made of a same material as the first frame 2. The second frame 4 is arranged between the light guide plate 5 and the back plate 6. For example, the second frame 4 surrounds the light guide plate 5 and matches or fits with the light guide plate 5 in shape. As an example, if the first portion 51 of the light guide plate is a rectangle and the second portion 52 is a right triangle, then the frame body of the second frame 4 surrounding the first portion 51 is also a rectangle, and the frame body of the second frame 4 surrounding the second portion 52 is accordingly a right triangle with its hypotenuse coinciding with that of the second portion 52.

Figure 4:
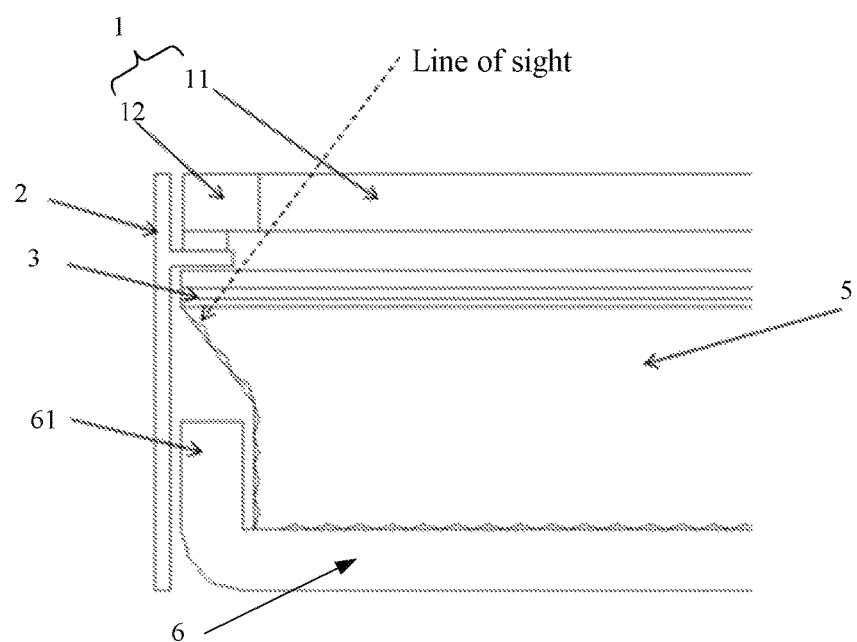
FIG. 4 is a schematic section view of the structure of a display panel according to a further embodiment of this disclosure.

Referring to FIG. 4, the display panel can comprise a display substrate 1, an optical substrate 3, a light guide plate 5, a first frame 2 and a back plate 6, excluding a second frame 4, so as to save the cost and reduce the volume and the weight of the display panel.

In the display panels provided in the embodiments of this disclosure, the length of the light guide plate is increased, and the increased portion of the light guide plate extends into the first frame, enabling the light rays emitted from the backlight source to completely illuminate the display region after being reflected by the light guide plate, such that the user can see contents displayed in the display region, which improves the display effect.

An embodiment of this disclosure provides a display device, the display device comprising any of the display panels as shown in FIG. 2 and FIG. 4. In a practical application, the display device can be any product or component having a display function, such as a smart phone, a tablet computer, a smart television, a desk computer, a digital photo frame, a navigator and the like.

In the display device provided in the embodiment of this disclosure, the length of the light guide plate is increased, and the increased portion of the light guide plate extends into the first frame, enabling the light rays emitted from the backlight source to completely illuminate the display region after being reflected by the light guide plate, such that the user can see contents displayed in the display region, which improves the display effect.

What is disclosed above are only optional embodiments of the present invention, which are not intended to limit the present invention. Therefore, any amendment, equivalent replacement and improvement made within spirits and scopes of the present invention shall fall within the scopes of the present invention.

The invention claimed is:

1. A display panel comprising: a display substrate, an optical substrate, a light guide plate and a first frame; wherein:
   the optical substrate is arranged between the display substrate and the light guide plate, and the first frame is arranged on the same side edge of the display substrate, the optical substrate and the light guide plate;
   the light guide plate comprises a first portion and a second portion, wherein the second portion is formed by the first portion extending to the first frame from a side close to the first frame, and the distance between the second portion and the first frame is smaller than the thickness of the light guide plate;
   wherein the light guide plate further comprises a plurality of reflectors, the of reflectors being at least arranged on a side surface of the second portion close to the first frame and on a horizontal surface of the first portion.

2. The display panel according to claim 1, wherein the shape of a cross-section of the second portion comprises a triangle, a rectangle, a trapezoid, or an arc.

3. The display panel according to claim 1, wherein each of the plurality of reflectors comprises a conic reflector, a cylindrical reflector, a cubic reflector, a triangular reflector, a rectangular reflector, a trapezoidal reflector or a rhombic reflector.

4. The display panel according to claim 1, wherein the optical substrate extends to the first frame, and the distance between the optical substrate and the first frame is smaller than the thickness of the optical substrate.

5. The display panel according to claim 1, wherein the display panel further comprises a back plate, the back plate being arranged on a side of the light guide plate facing away from the optical substrate.

6. The display panel according to claim 5, wherein the display panel further comprises a second frame, the second frame being arranged between the light guide plate and the back plate.

7. The display panel according to claim 6, wherein the second frame surrounds the light guide plate, and the shape of the second frame matches that of the light guide plate.

8. The display panel according to claim 5, wherein the back plate further comprises a convex portion, the convex portion being arranged between the first frame and the light guide plate.

9. A display device, comprising the display panel according to claim 1.

10. The display device according to claim 9, wherein the shape of a cross-section of the second portion comprises a triangle, a rectangle, a trapezoid, or an arc.

11. The display device according to claim 9, wherein each of the plurality of reflectors comprises a conic reflector, a cylindrical reflector, a cubic reflector, a triangular reflector, a rectangular reflector, a trapezoidal reflector or a rhombic reflector.

12. The display device according to claim 9, wherein the optical substrate extends to the first frame, and the distance between the optical substrate and the first frame is smaller than the thickness of the optical substrate.

13. The display device according to claim 9, wherein the display panel further comprises a back plate, the back plate being arranged on a side of the light guide plate facing away from the optical substrate.

14. The display device according to claim 13, wherein the display panel further comprises a second frame, the second frame being arranged between the light guide plate and the back plate.

15. The display device according to claim 14, wherein the second frame surrounds the light guide plate, and the shape of the second frame matches that of the light guide plate.

16. The display device according to claim 13, wherein the back plate further comprises a convex portion, the convex portion being arranged between the first frame and the light guide plate.

* * * * *